US008861015B2

(12) United States Patent  (10) Patent No.: US 8,861,015 B2
Ireland  (45) Date of Patent: Oct. 14, 2014

(54) PREPARING AN ELECTRONIC DOCUMENT OF CONTINUOUS INFORMATION FOR DOCUMENT EXCHANGE THAT SUPPORTS CONTINUOUS AND PAGE-BY-PAGE PRINTING

(75) Inventor: Peter Ireland, Eastleigh (GB)

(73) Assignee: Schlumberger Technology Corporation, Houston, TX (US)

( * ) Notice: Subject to any disclaimer, the term of this patent is extended or adjusted under 35 U.S.C. 154(b) by 1764 days.

(21) Appl. No.: 11/963,288

(22) Filed: Dec. 21, 2007

(65) Prior Publication Data

US 2009/0161146 A1  Jun. 25, 2009

(51) Int. Cl.
*G06K 15/00* (2006.01)
*G06F 3/12* (2006.01)
*G06F 17/21* (2006.01)

(52) U.S. Cl.
CPC ............ *G06F 3/1285* (2013.01); *G06F 17/211* (2013.01); *G06F 3/125* (2013.01); *G06F 3/1242* (2013.01); *G06F 3/1208* (2013.01)
USPC ......... 358/1.18; 358/1.12; 382/284; 382/294; 399/384; 101/288

(58) Field of Classification Search
CPC ...... G06F 3/12; G06K 15/024; G06K 15/022; H04N 1/387
USPC ............ 358/1.2, 1.3, 1.6, 1.7, 3.07, 3.2, 3.24, 358/3.3, 296, 1.12, 1.13, 1.15, 1.18, 304, 358/1.9; 101/93, 93.13, 288; 400/323, 319; 382/173, 284, 294; 399/384, 375
See application file for complete search history.

(56) References Cited

U.S. PATENT DOCUMENTS 4,637,974 A * 1/1987 Kubit ....................... 430/123.41
5,115,493 A * 5/1992 Jeanblanc et al. ........... 358/1.18

(Continued)

FOREIGN PATENT DOCUMENTS

JP  2257212 A  10/1990
JP  5169758 A   7/1993

(Continued)

OTHER PUBLICATIONS

PCT, International Application No. PCT/US2008/084667, Filed Nov. 25, 2008, Mailing Date: Jun. 23, 2009, Notification of Transmittal of the International Search Report and the Written Opinion of the International Searching Authority, or the Declaration and Written Opinion of the International Searching Authority.

(Continued)

*Primary Examiner* — Jamares Q Washington
(74) *Attorney, Agent, or Firm* — Kimberly Ballew

(57) ABSTRACT

An approach that prepares an electronic document of continuous information for document exchange that simultaneously supports continuous and page-by-page printing is described. In one embodiment, there is an electronic document generator tool for document exchange that includes an input component configured to receive input with respect to preparing the electronic document of continuous information for continuous and page-by-page printing. The input comprises an indication to represent the electronic document of continuous information in a page-based file format for document exchange and an indication of target page sizes with respective unprintable margins that are desired for printing the electronic document of continuous information. A printable area customization component is configured to customize the electronic document of continuous information into a page-by-page electronic document that is suitable for both continuous and page-by-page printing without loss of information, scale changes and/or gaps of continuity. The printable area customization component is configured to determine a custom page size that represents the continuous information and prints to the target page sizes without loss of information, scale changes and/or gaps of continuity.

11 Claims, 3 Drawing Sheets

(56) References Cited

U.S. PATENT DOCUMENTS

| | | | |
|---|---|---|---|
| 5,377,540 A * | 1/1995 | Songe et al. | 73/152.02 |
| 5,600,412 A * | 2/1997 | Connors | 399/81 |
| 6,031,624 A * | 2/2000 | Murphy | 358/1.17 |
| 6,324,353 B1 * | 11/2001 | Laussermair et al. | 399/16 |
| 6,591,076 B2 * | 7/2003 | Connors | 399/194 |
| 6,744,530 B1 * | 6/2004 | Someno et al. | 358/1.18 |
| 6,808,028 B2 * | 10/2004 | Woodburn et al. | 175/48 |
| 7,184,167 B1 * | 2/2007 | Ito et al. | 358/1.18 |
| 7,207,735 B2 * | 4/2007 | Narusawa et al. | 400/76 |
| 7,298,510 B2 * | 11/2007 | Natori | 358/1.15 |
| 7,495,803 B2 * | 2/2009 | Natori | 358/1.9 |
| 7,528,986 B2 * | 5/2009 | Kato | 358/1.18 |
| 7,590,778 B2 * | 9/2009 | Ludwig et al. | 710/56 |
| 7,633,659 B2 * | 12/2009 | Uotani et al. | 358/527 |
| 2004/0125390 A1 * | 7/2004 | Miki | 358/1.9 |
| 2005/0244603 A1 * | 11/2005 | Hodsdon et al. | 428/40.1 |
| 2006/0015804 A1 * | 1/2006 | Barton et al. | 715/503 |
| 2007/0101262 A1 * | 5/2007 | Suzuki et al. | 715/525 |
| 2009/0043628 A1 * | 2/2009 | Gombert | 705/8 |

FOREIGN PATENT DOCUMENTS

| | | |
|---|---|---|
| JP | 7192115 A | 7/1995 |
| JP | 2005161568 A | 6/2005 |

OTHER PUBLICATIONS

International Application No. PCT/US2008/084667, filed Nov. 25, 2008, Notification Concerning Transmittal of International Preliminary Report on Patentability Chapter 1 of the Patent Cooperation Treaty dated Jul. 1, 2010.

* cited by examiner

PREPARING AN ELECTRONIC DOCUMENT OF CONTINUOUS INFORMATION FOR DOCUMENT EXCHANGE THAT SUPPORTS CONTINUOUS AND PAGE-BY-PAGE PRINTING

FIELD OF THE INVENTION

The present invention relates generally to electronic documents containing continuous information and more specifically to preparing an electronic document of a well log for document exchange in a manner that supports both continuous and page-by-page printing.

BACKGROUND OF THE INVENTION

An oil or well log contains a display of one or more log measurements. The log is typically stored electronically and can be printed on a strip of paper with depth (or time) in one axis. A typical log is 8.25 inches wide and is presented on folded paper of indeterminate length, but about 9.25 inches (234.9 millimeters) wide. Often, it is desirable to store the log in an electronic document form that is suitable for document exchange. The Portable Document Format (PDF) created by Adobe Systems is one format that can be used to represent two-dimensional documents in a device-independent and display resolution-independent fixed-layout document format. Issues can arise when it is desired to print the log from PDF or other document exchange formats used to digitize these logs. Because PDF and other document exchange formats are page-based they are unable (from a single file) to generate a print of the continuous information contained in the logs from both a page-by-page printer and a continuous printer that is a true representation of the logs. In particular, a page-by-page printer will printout the log on multiple pages of paper but there will be small gaps between consecutive pages. Often scissors are used to cut-out these gaps and tape is used to attach the multiple pages of paper to form a printout that is a true representation of the continuous information in the log. Attempts to squeeze the information in the log to produce a continuous printout on multiple pages of paper by adjusting margins result in clipping of information and/or scaling of information and/or generating gaps in the print. As a result, a PDF file, or other document exchange formats used to digitize these logs are really only suited for either continuous printing or page-by-page printing, but not both.

SUMMARY OF THE INVENTION

In one embodiment, there is a method for preparing an electronic document of continuous information for continuous and page-by-page printing. In this embodiment, the method comprises: receiving an indication to represent the electronic document of continuous information in a page-based file format for document exchange; receiving an indication of target page sizes with respective unprintable margins that are desired for printing the electronic document of continuous information; determining a custom page size configured to represent the continuous information and print to the target page sizes without loss of information, scale changes and/or gaps of continuity; and customizing the electronic document of continuous information into a page-by-page electronic document in accordance with the determined custom page size, wherein the page-by-page electronic document is suitable for both continuous and page-by-page printing without loss of information, scale changes and/or gaps of continuity.

In a second embodiment, there is a computer system for preparing an electronic document of continuous information for continuous and page-by-page printing. In this embodiment, the system comprises at least one processing unit and memory operably associated with the at least one processing unit. An electronic document generator tool for document exchange is storable in memory and executable by the at least one processing unit. The tool comprises an input component configured to receive input with respect to preparing the electronic document of continuous information for continuous and page-by-page printing. The input comprises an indication to represent the electronic document of continuous information in a page-based file format for document exchange and an indication of target page sizes with respective unprintable margins that are desired for printing the electronic document of continuous information. A printable area customization component is configured to customize the electronic document of continuous information into a page-by-page electronic document that is suitable for both continuous and page-by-page printing without loss of information, scale changes and/or gaps of continuity. The printable area customization component is configured to determine a custom page size that represents the continuous information and prints to the target page sizes without loss of information, scale changes and/or gaps of continuity.

In a third embodiment, there is a computer-readable medium storing computer instructions, which when executed, enables a computer system to prepare an electronic document of a well log containing continuous information for continuous and page-by-page printing. In this embodiment, the computer instructions comprises receiving an indication to represent the electronic document of the well log of continuous information in a page-based file format for document exchange; receiving an indication of target page sizes with respective unprintable margins that are desired for printing the electronic document of the well log of continuous information, wherein the target page sizes comprise letter, A4, legal and continuous (9.25 inches wide); determining a custom page size configured to represent the continuous information and print to the target page sizes without loss of information, scale changes and/or gaps of continuity; and customizing the electronic document of the well log of continuous information into a page-by-page electronic document in accordance with the determined custom page size, wherein the page-by-page electronic document is suitable for both continuous and page-by-page printing without loss of information, scale changes and/or gaps of continuity, wherein the customizing comprises instructions for developing a custom page size that fits the target page sizes.

In a fourth embodiment, there is a method for deploying an electronic document generator tool for document exchange of a well log containing continuous information in a computer system as a service for facilitating preparation of the electronic document for continuous and page-by-page printing. In this embodiment, a computer infrastructure is provided and is operable to receive an indication to represent the electronic document of the well log of continuous information in a page-based file format for document exchange; receive an indication of target page sizes with respective unprintable margins that are desired for printing the electronic document of the well log of continuous information, wherein the target page sizes comprise letter, A4, legal and continuous (9.25 inches wide) with an unprintable margin of 0.25 inches; determine a custom page size configured to represent the continuous information and print to the target page sizes without loss of information, scale changes and/or gaps of continuity; and customize the electronic document of the well log of continuous information into a page-by-page electronic document in accordance with the determined custom page size, wherein the page-by-page electronic document is suitable for both continuous and page-by-page printing without loss of information, scale changes and/or gaps of continuity as a service to a third party.

Additional objects and advantages of the invention will become apparent to those skilled in the art upon reference to the detailed description taken in conjunction with the provided figures.

BRIEF DESCRIPTION OF THE DRAWINGS

The present invention is illustrated by way of example and not intended to be limited by the figures of the accompanying drawings in which like references indicate similar elements and in which.

DETAILED DESCRIPTION

Figure 1:
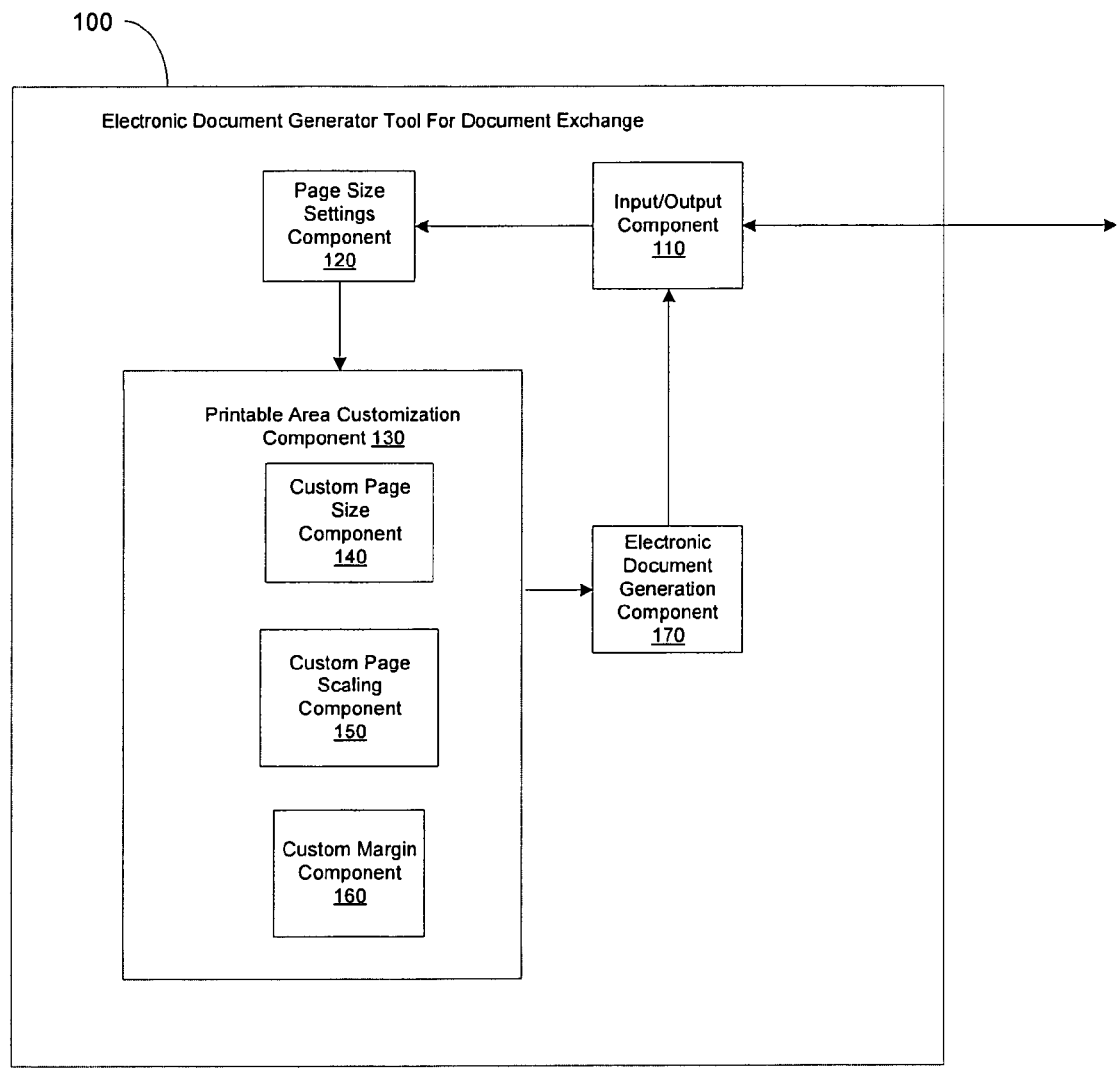
FIG. 1 shows a schematic block diagram of an electronic document generator tool for document exchange of continuous information that prepares the document for both continuous and page-by-page printing according to one embodiment of this invention.

Advantages and features of the present invention may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification Embodiments of this invention are directed to a technique for preparing an electronic document of a well log for document exchange in a manner that supports both continuous and page-by-page printing. Although the technique is described with reference to a well or oil log, the technique is suitable for use with any electronic document containing continuous information that is stored in a page-based format for document exchange and where it is desirable to print the document to a continuous printer and/or a page-by-page printer without having loss of information, scale changes and gaps of continuity.

FIG. 1 shows a schematic block diagram of an electronic document generator tool 100 for document exchange of continuous information that prepares the document for both continuous and page-by-page printing according to one embodiment of this invention. The electronic document generator tool 100 comprises an input/output component 110 configured to receive input and output. In particular, the input/output component 110 is configured to receive input with respect to preparing the log of continuous information into an electronic document for document exchange. In one embodiment, the input comprises an indication that there is a desire to represent the log of continuous information into a page-based file format for document exchange. In addition, the input comprises an indication of the target page sizes and their unprintable margins that are desired for printing this electronic document of continuous information. Those skilled in the art will recognize that input to the input/output component 110 can comprise other items such as page orientation (landscape, portrait), scaling, centering, print quality settings such as dots per inch (DPI), and color/B&W (black and white).

A page size settings component 120 is configured to set a page setting in accordance with the inputted target page sizes. In one embodiment, the inputted target page sizes can comprise two or more from a list containing predetermined page sizes. The predetermined page sizes comprise any one of well-known page sizes used in the preparation and printing of documents. Examples of page sizes that could be represented in the list of predetermined page sizes are letter (8.5 inches by 11 inches or 215.9 millimeters by 279.4 millimeters), A4 (8.27 inches by 11.68 inches or 210 millimeters by 297 millimeters), legal (8.5 inches by 14 inches or 216 millimeters by 356 millimeters) and continuous page sizes (9.25 inches or 235 millimeters in width and very long in length). These page sizes are only illustrative of page sizes that can be in the list of predetermined pages sizes and are not limiting. Those skilled in the art will recognize that the list can include other page sizes such as executive, A5, etc.

Referring back to FIG. 1, the electronic document generator tool 100 also includes a printable area customization component 130 that is configured to customize the electronic document of log of continuous information into a printable area with an appropriate margin definition that is suitable for both continuous and page-by-page printing without loss of information, scale changes and/or gaps of continuity. As shown in FIG. 1, the printable area customization component 130 comprises a custom page size component 140 that is configured to develop a custom page size that fits all of the target page sizes (e.g., letter, A4, legal, continuous page). Essentially, the custom page size component 140 creates the custom page size by overlapping all of the target page sizes in the list, concealing the unprintable 0.25 inches (6.3 millimeters) margins of the page sizes, and determining a printable area that can print on all of the target page sizes with true scaling of information and no truncation of information and/or gaps of continuity. A custom margin component 160 sets the margins for the output to prevent truncation, though these are set to 0 inches (0 millimeters) in one embodiment to ensure the print has no gaps or loss of continuity. Those skilled in the art will recognize that in other applications it may be desirable to have other margin settings.

As an example, assume that the list of target page sizes comprises A4, letter and continuous 9.25 inch wide, each with an unprintable margin of 0.25 inches. The maximum size of image that can be printed for each of these page sizes with true scaling and no truncation is summarized below in Table 1.

TABLE 1

| Paper Type | Paper Size | Printable area (size minus margins, with margins assumed 0.25-in.) |
|---|---|---|
| A4 | 8.27 × 11.68 in. | 7.77 × 11.18 in. |
| Letter | 8.5 × 11 in. | 8.0 × 10.5 in. |
| Continuous | 9.25 × . . . | 8.75 × . . . |

The custom page size component 140 determines the printable area that can print on the A4, letter and continuous page sizes with true scaling of information and no truncation of information by finding the smallest dimensions for the width and printable area from all of these page sizes. In this example, the maximum width for A4 and letter (when the paper is portrait) is 7.77 inches (197.4 millimeters) or 8.0 inches (203 millimeters)—which would not allow the printing of the full width of 8.25 inches (209.5 millimeters). Therefore, when printing on A4/letter, the paper will need to be printed on in landscape mode. The width of the printable area would need to be 8.25 inches (209.5 millimeters) to capture all of the information. The height of the printable area will need to be the minimum height of A4/letter when in the landscape orientation. This is 7.77 inches (197.4 millimeters). To allow printing to continuous paper, the captured information should be on a custom page size with no margins—i.e., the information goes all the way to the edge. Therefore, in this example, the custom page size component 140 will generate a custom page size of 8.25 inches by 7.77 inches (209.5 millimeters by 197.4 millimeters) that can print the image without truncating or shrinking. Those skilled in the art will recognize this custom page setting is variable and dependent upon the list of target page sizes and unprintable margin. For instance, if the unprintable margin of target printers had to be changed from 0.25 inches (6.35 millimeters) to 0.3 inches (7.6 millimeters), then the calculations would change.

The printable area customization component 130 also comprises a custom page scaling component 150 configured to specify that the printable area have a page scaling setting that is devoid of scale. In particular, the custom page scaling component 150 is configured to set the page scaling to none in order to further ensure that the electronic document provides true scaling of the log.

An electronic document generation component 170 receives the settings provided by the printable area customization component 130 and generates an electronic document of the log that can print to both a continuous printer or a page-by-page printer. The electronic document generation component 170 will then transfer this created electronic document to the input/output component 110 for output to a printer or if desired transfer for document exchange.

Figure 2:
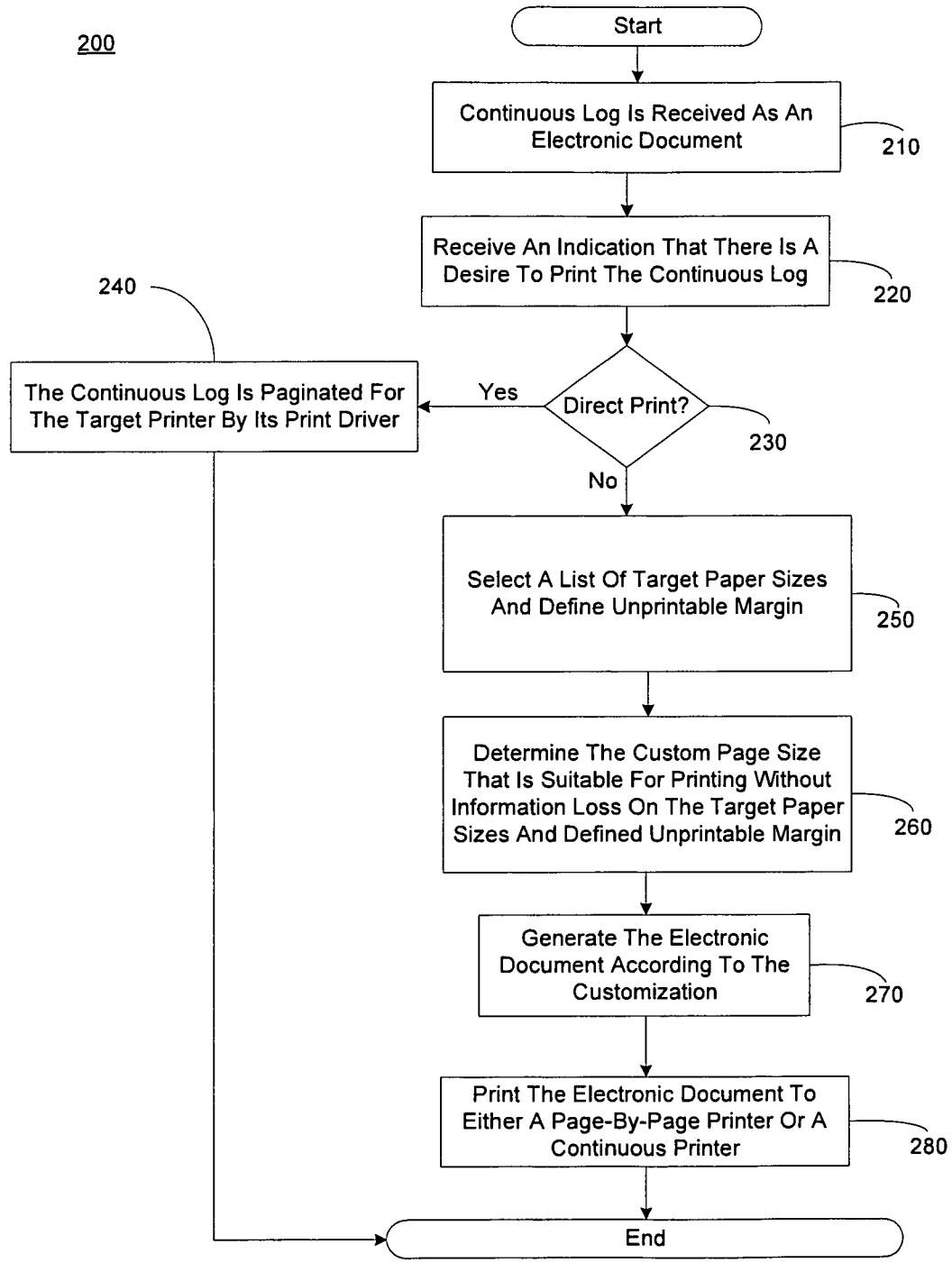
FIG. 2 shows a flow chart describing a process of preparing an electronic document containing continuous information for both continuous and page-by-page printing according to one embodiment of this invention.

FIG. 2 shows a flow chart describing a process 200 of preparing an electronic document of a log containing continuous information for both continuous and page-by-page printing according to one embodiment of this invention. As shown in FIG. 2, the process 200 begins at 210 where the log of continuous information is received in a computer system as an electronic document. The input/output component 110 of the electronic document generator tool 100 receives an indication at 220 that there is a desire to represent the log of continuous information into a page-based file format for document exchange. At decision block 230 it is ascertained whether there is an indication expressing a desire for a direct print. If there is a desire for a direct print, then the log of continuous information is paginated for the target printer by its print driver (page-by-page or continuous) at 240.

Alternatively, if there is no desire for a direct print as ascertained at 230, then the page size settings component 120 represents the electronic document of the log in a page-based format for document exchange at 250. As mentioned above, this includes selecting a list of target page sizes (e.g., letter, A4, legal, etc.) and defining the unprintable margin. At 260, the printable area customization component 130 determines a custom page size that is suitable for printing without information loss on the above-mentioned target paper sizes, and customizes the electronic document of the log of continuous information into this page size so that it is suitable for both continuous and page-by-page printing without loss of information, scale changes and/or gaps of continuity. As mentioned above, this includes developing a custom page size that fits all of the page sizes in the list of target page sizes (e.g., letter, A4, legal, continuous page), specifying that the printable area has a page scaling setting that is devoid of scale and specifying zero margins that prevent truncation of the log.

The electronic document generation component 170 receives the customized settings provided by the printable area customization component 130 and generates an electronic document of the log that can print to both a page-by-page printer and a continuous printer at 270. As mentioned above, a page-by-page printer or continuous printer can print this newly created electronic document onto varying page sizes without loss of information, scale changes and/or gaps of continuity. The electronic document generation component 170 will then transfer this created electronic document to the input/output component 110 for output to a page-by-page printer or a continuous printer for printing at 280.

The foregoing flow chart shows some of the processing functions associated with preparing an electronic document of a log containing continuous information for both continuous and page-by-page printing according to one embodiment of this invention. In this regard, each block represents a process act associated with performing these functions. It should also be noted that in some alternative implementations, the acts noted in the blocks may occur out of the order noted in the figure or, for example, may in fact be executed substantially concurrently or in the reverse order, depending upon the act involved. Also, one of ordinary skill in the art will recognize that additional blocks that describe the processing functions may be added.

In another embodiment of this invention, the electronic document generator tool 100 can be used as a service for using the tool to generate an electronic document of a log containing continuous information for both continuous and page-by-page printing without loss of information, scale changes and/or gaps of continuity. In this embodiment, a third party service provider could offer this electronic document generator tool 100 as a service by performing the functionalities described herein on a subscription and/or fee basis. In this case, the third party service provider can create, deploy, maintain, support, etc., the electronic document generator tool 100 that performs the processes described in the disclosure. In return, the third party service provider can receive payment for providing this capability.

In still another embodiment, the methodologies disclosed herein can be used within a computer system to generate an electronic document of a log containing continuous information for both continuous and page-by-page printing without loss of information, scale changes and/or gaps. In this case, the electronic document generator tool 100 can be provided and one or more systems for performing the processes described in the disclosure can be obtained and deployed to a computer infrastructure. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

Figure 3:
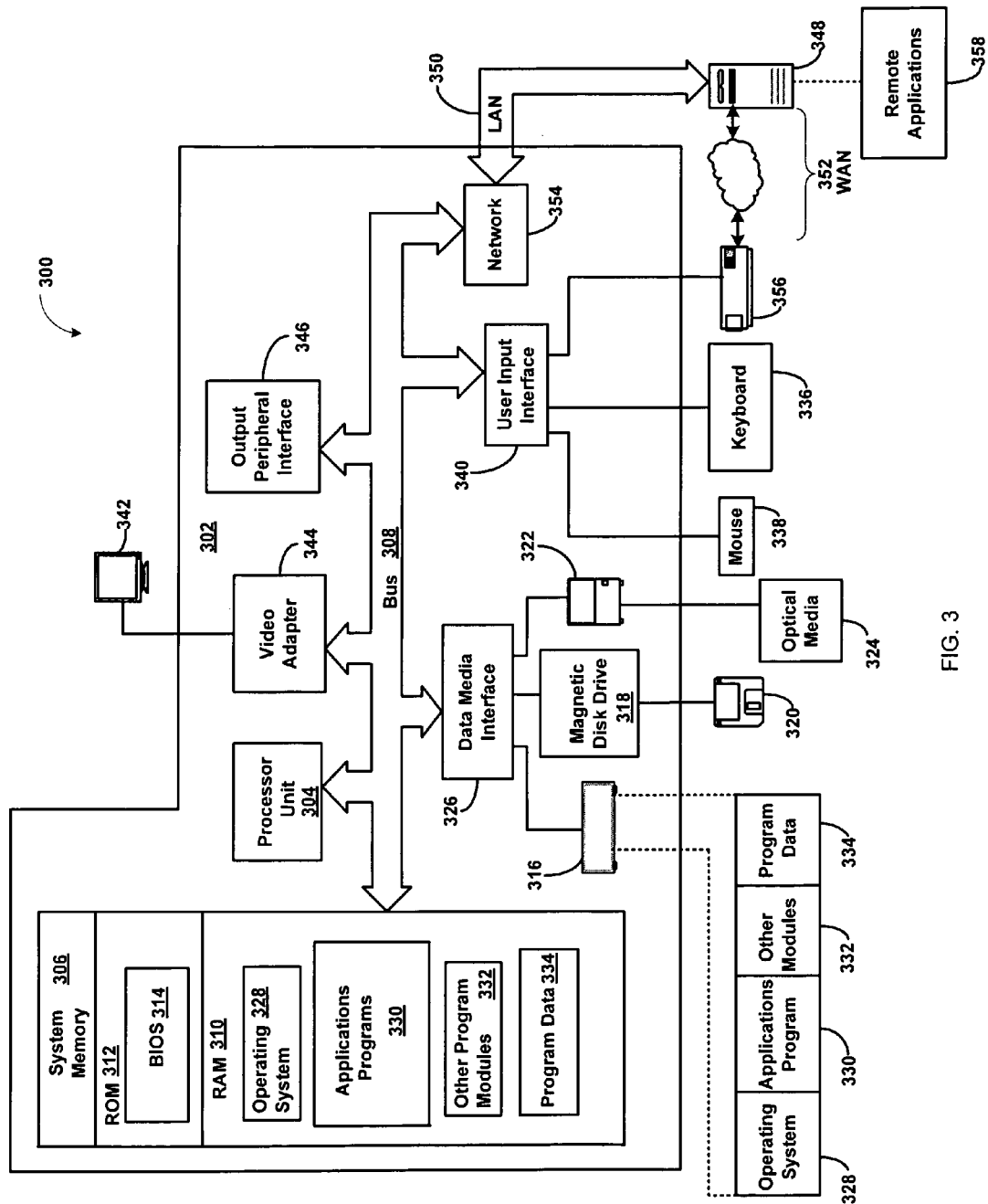
FIG. 3 shows a schematic of an exemplary computing environment in which the electronic document generator tool shown in FIG. 1 may operate.

FIG. 3 shows a schematic of an exemplary computing environment 300 in which the electronic document generator tool 100 shown in FIG. 1 may operate. The exemplary computing environment 300 is only one example of a suitable computing environment and is not intended to suggest any limitation as to the scope of use or functionality of the approach described herein. Neither should the computing environment 300 be interpreted as having any dependency or requirement relating to any one or combination of components illustrated in FIG. 3.

In the computing environment 300 there is a computer 302 which is operational with numerous other general purpose or special purpose computing system environments or configurations. Examples of well known computing systems, environments, and/or configurations that may be suitable for use with an exemplary computer 302 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary computer 302 may be described in the general context of computer-executable instructions, such as program modules, being executed by a computer. Generally, program modules include routines, programs, objects, components, logic, data structures, and so on, that performs particular tasks or implements particular abstract data types. The exemplary computer 302 may be practiced in distributed computing environments where tasks are performed by remote processing devices that are linked through a communications network. In a distributed computing environment, program modules may be located in both local and remote computer storage media including memory storage devices.

As shown in FIG. 3, the computer 302 in the computing environment 300 is shown in the form of a general-purpose computing device. The components of computer 302 may include, but are not limited to, one or more processors or processing units 304, a system memory 306, and a bus 308 that couples various system components including the system memory 306 to the processor 304.

Bus 308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 302 typically includes a variety of computer readable media. Such media may be any available media that is accessible by computer 302, and it includes both volatile and non-volatile media, removable and non-removable media.

In FIG. 3, the system memory 306 includes computer readable media in the form of volatile memory, such as random access memory (RAM) 310, and/or non-volatile memory, such as ROM 312. A BIOS 314 containing the basic routines that help to transfer information between elements within computer 302, such as during start-up, is stored in ROM 312. RAM 310 typically contains data and/or program modules that are immediately accessible to and/or presently operated on by processor 304.

Computer 302 may further include other removable/non-removable, volatile/non-volatile computer storage media. By way of example only, FIG. 3 illustrates a hard disk drive 316 for reading from and writing to a non-removable, non-volatile magnetic media (not shown and typically called a "hard drive"), a magnetic disk drive 318 for reading from and writing to a removable, non-volatile magnetic disk 320 (e.g., a "floppy disk"), and an optical disk drive 322 for reading from or writing to a removable, non-volatile optical disk 324 such as a CD-ROM, DVD-ROM or other optical media. The hard disk drive 316, magnetic disk drive 318, and optical disk drive 322 are each connected to bus 308 by one or more data media interfaces 326.

The drives and their associated computer-readable media provide nonvolatile storage of computer readable instructions, data structures, program modules, and other data for computer 302. Although the exemplary environment described herein employs a hard disk 316, a removable magnetic disk 318 and a removable optical disk 322, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on the hard disk 316, magnetic disk 320, optical disk 322, ROM 312, or RAM 310, including, by way of example, and not limitation, an operating system 328, one or more application programs 330, other program modules 332, and program data 334. Each of the operating system 328, one or more application programs 330 other program modules 332, and program data 334 or some combination thereof, may include an implementation of the electronic document generator tool 100 shown in FIG. 1.

A user may enter commands and information into computer 302 through optional input devices such as a keyboard 336 and a pointing device 338 (such as a "mouse"). Other input devices (not shown) may include a microphone, joystick, game pad, satellite dish, serial port, scanner, camera, or the like. These and other input devices are connected to the processor unit 304 through a user input interface 340 that is coupled to bus 308, but may be connected by other interface and bus structures, such as a parallel port, game port, or a universal serial bus (USB).

An optional monitor 342 or other type of display device is also connected to bus 308 via an interface, such as a video adapter 344. In addition to the monitor, personal computers typically include other peripheral output devices (not shown), such as speakers and printers, which may be connected through output peripheral interface 346.

Computer 302 may operate in a networked environment using logical connections to one or more remote computers, such as a remote server/computer 348. Remote computer 348 may include many or all of the elements and features described herein relative to computer 302.

Logical connections shown in FIG. 3 are a local area network (LAN) 350 and a general wide area network (WAN) 352. Such networking environments are commonplace in offices, enterprise-wide computer networks, intranets, and the Internet. When used in a LAN networking environment, the computer 302 is connected to LAN 350 via network interface or adapter 354. When used in a WAN networking environment, the computer typically includes a modem 356 or other means for establishing communications over the WAN 352. The modem, which may be internal or external, may be connected to the system bus 308 via the user input interface 340 or other appropriate mechanism.

In a networked environment, program modules depicted relative to the personal computer 302, or portions thereof, may be stored in a remote memory storage device. By way of example, and not limitation, FIG. 3 illustrates remote application programs 358 as residing on a memory device of remote computer 348. It will be appreciated that the network connections shown and described are exemplary and other means of establishing a communications link between the computers may be used.

An implementation of an exemplary computer 302 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this disclosure an approach that prepares an electronic document of continuous information for document exchange that supports continuous and page-by-page printing. While the disclosure has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

I claim:

1. A method, performed on a computer system, for preparing an electronic document of continuous information for continuous and page-by-page printing, comprising:
   using the computer system to perform the following:
      receiving an indication to represent the electronic document of continuous information in a multi-page format for document exchange, wherein the electronic document of continuous information contains information that is prolonged throughout multiple pages without interruption between pages;
      receiving an indication of a plurality of target page sizes with respective unprintable margins to be enabled to print to when the electronic document of continuous information is to be printed;
      determining a custom page size different from any one of the plurality of target page sizes, the custom page size having a printable area with a margin definition that is configured to represent the continuous information and print to all of the plurality of target page sizes without loss of information, scale changes and/or gaps of continuity, wherein the custom page size is determined by overlapping all of the plurality of target page sizes, concealing unprintable margins associated with each of the plurality of target page sizes, and determining a printable area that can print on all of the plurality of target page sizes without loss of information, scale changes and/or gaps of continuity; and
      customizing the electronic document of continuous information into a page-by-page electronic document of multiple pages each having the custom page size, wherein the page-by-page electronic document is suitable for both continuous and page-by-page printing to the plurality of target page sizes that are different from the custom page size without loss of information, scale changes and/or gaps of continuity and without necessitating cutting and pasting of paper to form a printout of the continuous information
      wherein the customizing of the electronic document of continuous information comprises developing the custom page size, wherein the custom page size is configured to fit each one of the plurality of target page sizes, wherein the plurality of target page sizes comprises letter, A4, legal and continuous (9.25 inches wide) with an unprintable margin of 0.25 inches (6.35 millimeters).

2. The method according to claim 1, wherein the customizing of the electronic document of continuous information comprises specifying a printable area that has a page scaling setting that is devoid of scale.

3. The method according to claim 1, wherein the customizing of the electronic document of continuous information comprises specifying a margin of zero that prevents truncation of the continuous information.

4. The method according to claim 1, wherein the electronic document of continuous information comprises a log.

5. A non-transitory computer-readable storage device storing computer instructions to:
   receive an indication to represent an electronic document of a well log of continuous information in a multi-page format for document exchange, wherein the electronic document of continuous information contains information that is prolonged throughout multiple pages without interruption between the multiple pages;
   receive an indication of a plurality of target page sizes with respective unprintable margins to be enabled to print to when the electronic document of the well log of continuous information is to be printed, wherein the plurality of target page sizes comprise a first page size used to print on a page-by-page basis and a second page size used to print on a continuous basis;
   overlap all of the plurality of target page sizes, conceal unprintable margins associated with each of the plurality of target page sizes, and determine a printable area that can print on all of the plurality of target page sizes without loss of information, scale changes and/or gaps of continuity, to thereby determine a custom page size different from any one of the plurality of target page sizes, the custom page size having a printable area with a margin definition that is configured to represent the continuous information and print to all of the plurality of target page sizes without loss of information, scale changes and/or gaps of continuity; and
   store the electronic document of the well log of continuous information into a format of a page-by-page electronic document of multiple pages each having the custom page size, wherein the page-by-page electronic document is configured to be printable on any one of the plurality of target page sizes without loss of information, scale changes and/or gaps of continuity at least because the custom page size fits all of the plurality the target page sizes;

wherein the custom page size is configured to fit each one of the plurality of target page sizes, wherein the plurality of target page sizes comprises letter, A4, and continuous (9.25 inches wide) with an unprintable margin of 0.25 inches (6.35 millimeters).

6. The non-transitory computer-readable storage device according to claim 5, wherein the instructions include instructions to, when the target page sizes consist of A4, letter and continuous (9.25 inches wide) with an unprintable margin of 0.25 inches (6.35 millimeters), determine the custom page size to be about 8.25 inches by 7.77 inches (209.5 millimeters by 197.4 millimeters) with no margins.

7. The non-transitory computer-readable storage device according to claim 5, wherein the instructions include instructions to specify the custom page size to have a printable area that has a page scaling setting that is devoid of scale and zero margins that prevent truncation of the continuous information.

8. The non-transitory computer-readable storage device according to claim 5, wherein the instructions include instructions to receive the indication of the plurality of target page sizes, wherein the first page size comprises letter, A4, or legal, and the second page size comprises continuous (9.25 inches wide).

9. A method comprising:
receiving into a processor a document of continuous information;
receiving into the processor an indication of a plurality of target page sizes onto which to be able to print the document of continuous information without loss of information, scale changes and/or gaps of continuity;
using the processor to determine a custom page size, the custom page size being different from any one of the plurality of target page sizes, by overlapping all of the plurality of target page sizes, concealing unprintable margins associated with each of the plurality of target page sizes, and determining a printable area that can print onto each of the plurality of target page sizes without loss of information, scale changes and/or gaps of continuity; and
using the processor to format the document of continuous information into a multi-page document paginated according to the custom page size, wherein the multi-page document of multiple pages of the custom page size is printable to the plurality of target page sizes that are different from the custom page size without loss of information, scale changes and/or gaps of continuity;
wherein determining the custom page size comprises fitting each one of the plurality of target page sizes, wherein the plurality of target page sizes comprises letter, A4, legal and continuous (9.25 inches wide) with an unprintable margin of 0.25 inches (6.35 millimeters).

10. The method of claim 9, comprising printing the multi-page document by:
when an indication is received by the processor to print the multi-page document paginated according to the custom page size to a continuous paper size of the plurality of target page sizes that are different from the custom page size, using the processor to cause the multi-page document to be printed to paper of the continuous paper size without loss of information, scale changes and/or gaps of continuity;
when an indication is received by the processor to print the multi-page document paginated according to the custom page size to a first non-continuous page size of the plurality of target page sizes that are different from the custom page size, using the processor to cause the multi-page document to be printed to paper of the first non-continuous page size without loss of information, scale changes and/or gaps of continuity; and
when an indication is received by the processor to print the multi-page document paginated according to the custom page size to a second non-continuous page size of the plurality of target page sizes that are different from the custom page size, causing the multi-page document to be printed to paper of the second non-continuous page size without loss of information, scale changes and/or gaps of continuity.

11. The method of claim 10, wherein the first non-continuous page size comprises letter, A4, or legal, and the second non-continuous page size comprises a different one of letter, A4, or legal from the first non-continuous page size.

* * * * *